US006879735B1

(12) United States Patent
Portniaguine et al.

(10) Patent No.: US 6,879,735 B1
(45) Date of Patent: Apr. 12, 2005

(54) METHOD OF DIGITAL IMAGE ENHANCEMENT AND SHARPENING

(75) Inventors: Oleg N. Portniaguine, Salt Lake City, UT (US); Michael S. Zhdanov, Salt Lake City, UT (US)

(73) Assignee: University of Utah Reasearch Foundation, Salt Lake City, UT (US)

( * ) Notice: Subject to any disclaimer, the term of this patent is extended or adjusted under 35 U.S.C. 154(b) by 0 days.

(21) Appl. No.: 09/787,309

(22) PCT Filed: Sep. 13, 1999

(86) PCT No.: PCT/US99/21067

§ 371 (c)(1),
(2), (4) Date: Jun. 4, 2001

(87) PCT Pub. No.: WO00/16249

PCT Pub. Date: Mar. 23, 2000

Related U.S. Application Data (60) Provisional application No. 60/100,136, filed on Sep. 14, 1998.

(51) Int. Cl.$^7$ .............................. G06K 9/40; G06K 9/62
(52) U.S. Cl. ..................... 382/275; 382/261; 382/263
(58) Field of Search .............................. 382/109, 113, 382/118, 275, 260–266

(56) References Cited

U.S. PATENT DOCUMENTS

| | | |
|---|---|---|
| 4,683,496 A | 7/1987 | Tom |
| 4,945,502 A | 7/1990 | Kwon et al. |
| 5,283,671 A | 2/1994 | Stewart et al. |
| 5,359,676 A * | 10/1994 | Fan ............................ 382/246 |
| 5,392,137 A | 2/1995 | Okubo |
| 5,602,934 A * | 2/1997 | Li et al. ...................... 382/128 |
| 5,627,918 A | 5/1997 | Carasso |
| 5,668,596 A | 9/1997 | Vogel |
| 5,717,789 A | 2/1998 | Anderson et al. |
| 5,761,346 A * | 6/1998 | Moody ........................ 382/254 |
| 6,055,340 A * | 4/2000 | Nagao ......................... 382/261 |
| 6,094,511 A * | 7/2000 | Metcalfe et al. ............ 382/260 |
| 6,266,054 B1 * | 7/2001 | Lawton et al. .............. 345/581 |
| 6,628,329 B1 * | 9/2003 | Kelly et al. ................. 348/252 |

OTHER PUBLICATIONS

"Inversion of Large–Supoort Ill–Posed Linear Operators Using a Piecewise Gaussian MRF" by Mila Nikolova, Jerome Idier, and Ali Mohammad–Djafari form IEEE Transactions on Image Processing, vol. 7, No. 4, Apr. 1998.*

Hiroshi Fujita, Du–Yih Tsai, Takumi Itoh, Kunio Doi, Junji Morishita, Katsuiko Ueda, and Akiyoshi Ohtsuka, *A Simple Method for Determining the Modulation Transfer Function in Digital Radiography*, IEEE Transactions on Medical Imaging, vol. 11, No. 1, pp. 34–39, Mar. 1992.

R. Acar and C. R. Vogel, *Analysis of Bounded Variation penalty Methods for III–posed Proglems*, IOP Publishing Ltd, pp. 1217–1229.

Bill C. Penney, Stephen J. Glick, and Michael A. King, *Relative Importance of the Error Sources in Wiener Restoration of Scintigrams*, IEEE Transaction of Medical Imaging, vol. 9, No. 1, pp. 60–70, Mar. 1990.

Ulrich Raff, Dennis N. Stroud, and William R. Hendee, *Improvement of Lesion Detection in Scintigraphic Images by SVD Techniques for Resolution Recovery*, IEEE Transactions on Medical Imaging, vol. MI–5, No. 1, pp. 35–44, Mar. 1986.

* cited by examiner

*Primary Examiner*—Amelia M. Au
*Assistant Examiner*—Wesley Tucker
(74) *Attorney, Agent, or Firm*—Knobbe Martens Olson & Bear LLP (57) ABSTRACT

A method of digital image enhancement and sharpening (11, 12) which may be applied to restoration of blurred digital images of arbitrary origin. The method uses a specially formulated constraint (15) to reconstruct the original images. In particular, the constraint of the present method minimizes the area where strong image parameter variations and discontinuities occur. This new constraint is called a minimum gradient support (MGS) constraint. The MGS constraint generates a stable sharp solution of the linear ill-posed image restoration equation with an arbitrary blurring operator.

18 Claims, 4 Drawing Sheets

Fig. 1

Ideal seismic image of geological cross-section.

*Fig. 2*

Blurred seismic image of geological cross-section.

*Fig. 3*

Reconstructed image.

*Fig. 4*

METHOD OF DIGITAL IMAGE ENHANCEMENT AND SHARPENING

PRIORITY CLAIM

This application claims the benefit of the filing date of U.S. Provisional Patent Application Ser. No. 60/100,136, filed Sep. 14, 1998 for "METHOD OF DIGITAL IMAGE ENHANCEMENT AND SHARPENING BASED ON MINIMUM GRADIENT SUPPORT CONSTRAINT."

TECHNICAL FIELD

The present invention relates in general to image processing, and, in particular, to image enhancement and sharpening.

The method, for example, can be applied to optical image processing, for image restoration and sharpening in biomedical, geophysical, astronomical, high definition television, re-mote sensing, and other industrial applications.

BACKGROUND ART

Comprehensive coverage of the prior art may be found, for example, in W. K. Pratt, "Digital Image Processing," 2nd Edition, John Wiley and Sons, NY (1988); H. Stark, "Image Recovery; Theory and Application," Academic Press, Inc., Harcout Brace Jovanovich Publishers, New York (1987); R. C. Gonzalez and P. Wintz, "Digital Image Processing," 2nd Edition, Addison-Wesley Publishing Company, Inc., Advanced Book Program, Reading, Mass. (1987); and R. L. Lagendijk and J. Biemond, "Iterative Identification and Restoration of Images," Kluwer International Series in Engineering and Computer Science, Kluwer Academic Publishers, Boston, Mass., (1991).

There have been several attempts to develop a method of image processing and restoration based on the solution of the linear ill-posed inverse problem:

$$d = Bm, \quad (1)$$

where d is the blurred (or degraded) image, m is original (or ideal) image, and B is the blurring linear operator of the imaging system. Note that the original image, as well as the blurred image, can be defined in a plane (2-D image: m=m(x,y), d=d(x,y)) or in a volume (3-D image: m=m(x,y,z), d=d(x,y,z)).

A wide variety of electron-optical devices obey equation (1) with different blurring operators as noted by C. B. Johnson et al., in "High-Resolution Microchannel Plate Image Tube Development," Electron Image Tubes and Image Intensifiers II, Proceedings of the Society of Photo-Optical Instrumentation Engineers, Vol. 1449. I. P. Csorba, Ed. (1991), pp. 2–12. These devices are used in various biomedical imaging apparatus, including image intensifier-video camera (II-TV) fluoroscopic systems (see S. Rudin et al., "Improving Fluoroscopic Image Quality with Continuously Variable Zoom Magnification," Medical Physics. Vol. 19 (1991), pp. 972–977); radiographic film digitizers (see F. F. Yin et al., "Measurement of the Presampling Transfer Function of Film Digitizers Using a Curve Fitting Technique," Medical Physics, Vol. 17 (1990), pp. 962–966); radiographic selenium imaging plates (see P. J. Papin and H. K. Huang, "A Prototype Amorphous Selenium Imaging Plate System for Digital Radiography," Medical Physics, Vol. 14 (1987), pp. 322–329); computed radiography systems (see S. Sanada et al., "Comparison of Imaging Properties of a Computed Radiography System and Screen-Film Systems." Medical Physics, Vol. 18 (1991), pp. 414–420; H. Fujita et al., "A Simple Method for Determining the Modulation Transfer Function in Digital Radiography," IEEE Transactions on Medical Imaging, Vol. 11 (1992), pp. 34–39); digital medical tomography systems (see M. Takahashi et al., "Digital 'IV Tomography: Description and Physical Assessment," Medical Physics, Vol. 17 (1990), pp. 681–685).

Geophysical, airborne, remote sensing, and astronomical blurred images also can be described by equation (1) (see M. Bath, "Modern Spectral Analysis with Geophysical Applications," Society of Exploration Geophysicists, (1995), 530 pp.; C. A. Legg, "Remote sensing and geographic information systems," John Wiley & Sons, Chichester, (1994), 157 pp.).

Most prior efforts to solve the problem: (1) are based on the methods of linear inverse problem solutions. Inverse problem (1) is usually ill-posed, i.e., the solution can be non-unique and unstable. The conventional way of solving ill-posed inverse problems, according to regularization theory (A. N., Tikhonov, and V. Y., Arsenin, "Solution of ill-posed problems," V. H. Winston and Sons., (1977); M. S., Zhdanov, "Tutorial: regularization in inversion theory," Colorado School of Mines (1993)), is based on minimization of the Tikhonov parametric functional:

$$P^\alpha(m) = \phi(m) + \alpha s(m), \quad (2)$$

where $\phi(m)$ is a misfit functional determined as a norm of the difference between observed and predicted (theoretical) degraded images:

$$\phi(m) = \|Bm - d\|^2 = (Bm - d, Bm - d). \quad (3)$$

Functional s(m) is a stabilizing functional (a stabilizer).

It is known in the prior art that there are several common choices for stabilizers. One is based on the least squares criterion, or, in other words, on $L_2$ norm for functions describing the image:

$$S_{L_2}(m) = \|m\|_2 = (m, m) = \int_V m^2 dv = \min, \quad (4)$$

where V is the domain (in 2-D space or in 3-D space) of image definition, and ( . . . , . . . ) denotes the inner product operation.

The conventional argument in support of this norm comes from statistics and is based on an assumption that the least square image is the best over the entire ensemble of all possible images.

Another stabilizer uses minimum norm of difference between the selected image and some a priori image $m_{apr}$:

$$S_{L_2apr}(m) = \|m - m_{apr}\|^2 = \min. \quad (5)$$

This criterion, as applied to the gradient of image parameters $\nabla m$, brings us to a maximum smoothness stabilizing functional:

$$s_{max\ sm}(m) = \|\nabla m\|^2 = (\nabla m, \nabla m) = \min. \quad (6)$$

Such a functional is usually used in inversion schemes. This stabilizer produces smooth images. However, in many practical situations the resulting images don't describe properly the original (ideal) image. Inversion schemes incorporating the aformentioned functional also can result in spurious oscillations when m is discontinuous.

It should be noted that in the context of this disclosure, "image parameters" is intended to describe the physical properties of an examined media. Such parameters include without limitation: color, intensity, density, field strength, and temperature. Discrete samples of such parameters are assembled, eg. in a matrix [d], to describe an image of the media. In the paper by (L. I., Rudin, Osher, S. and Fatemi, E., "Nonlinear total variation based noise removal algorithms," Physica D, 60, (1992), pp. 259–268) a total variation (TV) based approach to reconstruction of noisy, blurred images has been introduced. This approach uses a total variation stabilizing functional, which is essentially $L_1$ norm of the gradient:

$$s_{TV}(m)=\|\nabla m\|_{L_1}=\int_v |\nabla m| dv. \quad (7)$$

This criterion requires that an image's parameter distribution in some domain V be of bounded variation (for definition and background see (E., Giusti, "Minimal surfaces and functions of bounded variations," Birkhauser (1984)). However, this functional is not differentiable at zero. To avoid this difficulty, Acar and Vogel introduced a modified TV stabilizing functional (R., Acar, and C. R., Vogel, "Analysis of total variation penalty methods," Inverse Problems, 10, (1994), pp. 1217–1229):

$$s_{\beta TV}(m)=\int_v \sqrt{|\nabla m|^2+e^2} dv. \quad (8)$$

The advantage of this functional is that it doesn't require that the function m is continuous, but just that it is piecewise smooth (C. R., Vogel, and M. E., Oman, "A fast, robust algorithm for total variation based reconstruction of noisy, blurred images," IEEE Transactions on Image Processing, (1997)). The TV norm doesn't penalize discontinuity in the image parameters, so we can remove oscillations while sharp conductivity contrasts will be preserved. At the same time it imposes a limit on the total variation of m and on the combined arc length of the curves along which m is discontinuous.

TV functionals $s_{TV}(m)$ and $s_{\beta TV}(m)$, however, tend to decrease bounds of the image parameters variation, as can be seen from (7) and (8), and in this way still try to "smooth" the real image, but this "smoothness" is much weaker than in the case of traditional stabilizers (6) and (5).

In yet another development A. S. Carasso introduced a procedure for digital image restoration based on Tikhonov regularization theory and description of the blurred image d as the end result of a diffusion process applied to the desired ideal image m (A. S., Carasso, "Overcoming Holder Continuity in Ill-Posed Continuation Problems," SIAM Journal on Numerical Analysis, Volume 31, No. 6, December 1994, pp. 1535–1557; C. E., Carasso, U.S. Pat. No. 5,627,918, May 1997). In the framework of Carasso's method the image restoration procedure is equivalent to solving diffusion equation backwards in time using the given degraded image d as data at the final moment of diffusion. The desired ideal image is the corresponding solution of the diffusion equation at the initial time moment. To generate a stable solution, Carasso suggests to use a constraint $$\|m-B^s m\|=\min,$$

where $B^5$ is the fractional power of the operator B.

The main limitation of Carasso's approach is that it can be applied only to a specific class of integral blurring operators, which can be described by the diffusion problem solution.

In yet another development (H. Kwan, and J. T., Liang, Digital image sharpening method using SVD block transform, U.S. Pat. No. 4,945,502, Jul. 1990), the authors suggest to use the Singular Value Decomposition technique and a priori known information about the statistical properties of the noise and image texture to suppress the noise in the degraded images.

The foregoing attempts met with varying degrees of success in developing the methods of digital image restoration. However, from the point of view of practical applications, these methods are not entirely satisfactory. Therefore, it is highly desirable to develop a method which can be applied to a wide variety of image restoration problems.

DISCLOSURE OF THE INVENTION

In the method of the present invention, a new approach to digital image enhancement and sharpening is developed based on a new type of constraint on the solution which generates focused and sharp images.

The method of the present invention may be used in industrial applications, including biomedical imaging for human body study, for example, in breast cancer diagnosis, (see S. Webbet et al., "Constrained Deconvolution of SPECT Liver Tomograms by Direct Digital Image Restoration," Medical Physics, Vol. 12 (1985), pp. 53–58; U. Raft et al., "Improvement of Lesion Detection in Scintigraphic Images by SVD Techniques for Resolution Recovery," IEEE Transactions on Medical Imaging, Vol. MI-5(1986), pp. 35–44; B. C. Penney et al., "Constrained Least Squares Restoration of Nuclear Medicine images; Selecting the Coarseness Function," Medical Physics, Vol. 14 (1987), pp. 849–859; B. C. Penney et al., "Relative Importance of the Error Sources in Wiener Restoration of Scintigrams," IEEE Transactions on Medical Imaging, Vol. 9 (1990), pp. 60–70; K. S. Pentlow et al., "Quantitative Imaging Using Positron Emission Tomography with Applications to Radioimmunodiagnosis and Radioimmunot! herapy," Medical Physics, Vol. 18 (1991), pp. 357–366); magnetic resonance imaging (see S. M. Mohapatva et al. "Transfer Function Measurement and Analysis for a Magnetic Resonance Imager," Medical Physics, Vol. 18 (1991), pp. 1141–1144); and computed tomography scanners (see E. L. Nickoloff and R. Riley, "A Simplified Approach for Modulation Transfer Function Determinations in Computed Tomography," Medical Physics, Vol. 12 (1985), pp. 437–442).

The method of the present invention may also find application in night vision systems; imaging through the atmosphere; in observational astronomy (see N. S. Kopeika, "Imaging Through the Atmosphere for Airborne Reconnaissance," Optical Engineering, Vol. 26 (1987), pp. 1146–1154; J. D. Gonglewski and D. G. Voelz, "Laboratory and Field Results in Low Light Post-detection Turbulence Compensation Using Self Referenced Speckle Holography," Digital Image Synthesis and Inverse Optics, Proceedings of the Society of Photo-Optical Instrumentation Engineers, Vol. 1351, A. E. Gmitro, P. S. Idell, and I. J. LaHaie, Eds. (1990), pp. 798–806).

The instant method may also find excellent application in geophysical exploration for generating sharp resolved seismic, electromagnetic and gravity images of underground geological structures, for undersea imaging, in airborne geological and geophysical sensing and remote sensing for imaging from satellites (see M. Bath, "Modern Spectral Analysis with Geophysical Applications," Society of Exploration Geophysicists, (1995), 530 pp.; C. A. Legg, "Remote sensing and geographic information systems," John Wiley & Sons, Chichester, (1994), 157 pp.). Other important image sharpening applications of the present method include high definition television (HDTV) (see N. V. Rao, "Development of a High-Resolution Camera Tube for 2000-Line TV System," Electron Tubes and Image Intensifiers, Proceedings of the Society for Photo-Optical Instrumentation Engineers, Vol. 1243, I. P. Csorba, Ed. (1990), pp. 81–86).

The method of the present invention introduces a new approach to reconstruction of blurred images which is based on using a specially selected constraint or stabilizing functional (stabilizer). In particular, a new form of a constraint (stabilizer) which minimizes the area where strong image parameters variations and discontinuity occurs is developed. This new constraint may be characterized as a minimum gradient support (MGS) constraint. A MGS constraint in combination with a penalization function helps to generate a stable solution of the inverse linear problem (1) for arbitrary blurring imaging operator. The procedure of the instant method finds practical application to digital image enhancement in general.

The present invention provides a new method for digital image enhancement and sharpening in a system which can be described by the linear operator equation in a form d=Bm, where d is degraded (blurred) image, m is original (ideal) image, and B is the blurring operator of the imaging system. In this method, the norm of difference between the observed degraded image d and numerically predicted degraded image $d_{pr}$ corresponding to the sharp ideal image $m_S$ is preassigned to be equal to a given tolerance value $\epsilon$: $\|d-d_{pr}\|=\|d-Bm_S\|=\epsilon_1$ where $\|...\|$ denotes $L_2$ norm. The restored (sharpened) image is selected from the class of possible ideal images by minimization of the quantity:

$$\frac{\|\nabla m_s\|^2}{\|\nabla m_s \cdot \nabla m_s\| + e^2} = \text{minimum}$$

under the constraint $\|d-Bm_S\|=\epsilon_1$ where $\nabla m_S$ describes the spatial gradient of the image parameters, and e<<1 is a substantially small constant. The method can be implemented numerically using a general purpose computer, or it may be performed using dedicated hardware specially designed to solve constraint minimization problems.

BEST MODE FOR CARRYING OUT THE INVENTION

The principles of image enhancement and sharpening can be described as follows. We introduce a new constraint (stabilizer) which minimizes the area where strong image parameters variations and discontinuity occur. We call this new constraint (stabilizer) a minimum gradient support (MGS) constraint. We demonstrate that a MGS constraint in combination with the penalization function helps to generate a stable solution of the linear inverse problem (1) describing the image processing. We call this approach sharpening blurred images.

For the sake of simplicity we will discuss first a minimum support (MS) functional, which provides the image with the minimum area of the anomalous image parameters distribution.

Consider the following integral of the image parameters distribution in domain V:

$$J_e(m) = \int_v \frac{m^2}{m^2 + e^2} dv. \tag{9}$$

We introduce the support of m (denoted sptm) as the combined closed subdomains of V where m±0. We call sptm an image parameter support. Then expression (9) can be modified:

$$J_e(m) = \int_{spt_m} \left[1 - \frac{e^2}{m^2 + e^2}\right] dv = sptm - e^2 \int_{spt_m} \frac{1}{m^2 + e^2} dv. \tag{10}$$

¿ From the last expression (10) we can see that:

$$J_e(m) \to sptm, \text{ if } e \to 0. \tag{11}$$

Thus, integral $J_e(m)$ can be treated as a functional, proportional (for a small e) to the image parameter support. We can use this integral to introduce a minimum support stabilizing functional $s_{\beta MS}(m)$ as:

$$s_{\beta MS}(m) = J_e(m - m_{\alpha pr}) = \int_v \frac{(m - m_{\alpha pr})^2}{(m - m_{\alpha pr})^2 + e^2} dv \tag{12}$$

To justify this choice one can prove that $s_{\beta MS}(m)$ can actually be considered as a stabilizer according to regularization theory (A. N., Tikhonov, and V. Y., Arsenin, "Solution of ill-posed problems," V. H. Winston and Sons).

This functional has an important property: it minimizes the total area with nonzero departure of the image parameters from the given a priori image $m_{apr}$. Thus, a dispersed and smoothed distribution of the degraded image parameters with all values different from the a priori image $m_{apr}$ results in a big penalty function, while well-focused distribution with a small departure from $m_{apr}$ will have a small penalty function. A similar approach was originally used in the paper (B. J., Last, and K., Kubik, "Compact gravity inversion," Geophysics, 48, (1983), pp. 713–721) for compact gravity inversion.

We can use this property of a minimum support functional to increase the resolution of imaging system. To do so we modify $s_{eMS}(m)$ and introduce a minimum gradient support functional as:

$$s_{eMGS}(m) = J_e[\nabla m] = \int_v \frac{\nabla m \cdot \nabla m}{\nabla m \cdot \nabla m + e^2} dv. \tag{13}$$

We denote by spt∇m the combined closed subdomains of V where ∇m±0. We call spt∇m an image parameter gradient support (or, simply, gradient support). Then expression (13) can be modified:

$$s_{eMGS}(m) = spt\nabla m - e^2 \int_{spt\nabla_m} \frac{1}{\nabla m \cdot \nabla m + e^2} dv. \tag{14}$$

¿From the last expression we can see that:

$$S_{wMGS}(m) \to spt\nabla m, \text{ if } 3 \to 0. \tag{15}$$

Thus, we can see that $s_{eMGS}$ (m) can be treated as a functional, proportional (for a small e) to the gradient support. One can demonstrate that the minimum gradient support functional satisfies Tikhonov criterion for a stabilizer.

Thus we arrive at a new method of the present invention for blurred image restoration. In this method the norm of difference between the observed degraded image d and numerically predicted degraded image $d_{pr}$ corresponding to the sharp ideal image m, is preassigned to be equal to a given tolerance value $\epsilon$:

$$\|d-d_{pr}\|=\|d-Bm_s\|=\epsilon, \quad (16)$$

where $\|\ldots\|$ denotes $L_2$ norm. The restored (sharpened) image is selected from the class of possible ideal images by minimization of the quantity:

$$\frac{\|\nabla m_s\|^2}{\|\nabla m_s \cdot \nabla m_s\| + e^2} = \text{minimum}, \quad (17)$$

under the constraint $$\|d-Bm_s\|=\epsilon, \quad (18)$$

where $\nabla m_s$ describes the spatial gradient of the image parameters, and e<<1 is a small constant.

It can be demonstrated that the solution of the minimization problem (17) under the constraint (18) is reduced to the minimization of the unconstrained Tikhonov parametric functional $P^\alpha$ (equation (2)), which can be written as follows:

$$P^\alpha(m)=(Bm-d, Bm-d)+\alpha s_{eMGS}(m), \quad (19)$$

where( . . . , . . . ) denotes the inner product operation determined in (4), and $\alpha$ is regularization parameter.

The regularization parameter $\alpha$ describes the trade-off between the best fitting and reasonable stabilization. In a case when $\alpha$ is selected to be too small, the minimization of the parametric functional $P_\alpha(m)$ is equivalent to the minimization of the misfit functional $\phi(m)=(Bm-d, Bm-d)=$ minimum therefore we have no regularization, which can result in an unstable incorrect solution. When $\alpha$ is too large, the minimization of the parametric functional $P^\alpha(m)$ is equivalent to the minimization of the stabilizing functional $s_{eMGs}(m)$, which will force the solution to be closer to the a priori model. Ultimately, we would expect the final model to be exactly like the a priori model, while the observed data are totally ignored in the inversion. Thus, the critical question in the regularized solution of the inverse problem is the selection of the optimal regularization parameter $\alpha$. The basic principles use! d for determining the regularization parameter a are discussed in (A. N., Tikhonov, and V. Y., Arsenin, "Solution of ill-posed problems," V. H. Winston and Sons (1977)). We suggest to use a simple numerical method to determine the parameter $\alpha$. Consider for example the progression of numbers $$\alpha_k=\alpha_0 q^k; \; k=0,1,2,\ldots, n; \; q>0. \quad (20)$$

For any number $\alpha_k$ we can find an element $m_{\alpha_k}$, minimizing $P_\alpha^k(m)$, and calculate the misfit $\phi(m_{\alpha_k})$. The optimal value of the parameter a is the number $\alpha_{k0}$, for which we have $$\phi(m_{\alpha_{k0}}))=\epsilon, \quad (21)$$

where $\epsilon$ a given tolerance value. The equality (21) is called the misfit condition.

The important element of this invention is that we introduce a new parametrization $m_g$ of the reconstructed image m, equal to the gradient of original image parametrization:

$$m_g=\nabla m. \quad (22)$$

We cail $m_g$ image gradient parameters. Using the new parametrization $m_g$ we can rewrite the original equation of the imaging system (1) in a form:

$$d=B_g m_g, \quad (23)$$

where new blurring operator $B_g$ is composed of the original blurring operator B and inverse gradient (integral) operator $\nabla^{-1}$:

$$B_g=B\nabla^{-1}. \quad (24)$$

Taking into account notation (22) the MGS functional introduced above can be written as the squared $L_2$ norm of some functions of the model parameters:

$$s_{eMGS}(m)=(f(m_g), f(m_g)), \quad (25)$$

where $$f(m_g) = \frac{|m_g|}{(\|m_g\|^2 + e^2)^{\frac{1}{2}}}. \quad (26)$$

and e is a substantially small number.

In the method of this invention we introduce a variable weighting function:

$$w_e(m_g) = \frac{1}{(\|m_g\|^2 + e^2)^{\frac{1}{2}}}. \quad (27)$$

Then the MGS functional in general case can be written as $$s_{eMGS}(m) = (f(m_g), f(m_g)) \approx (w_e(m_g)m_g, w_e(m_g)m_g) =$$
$$= (m_g, m_g)_{w_e} = \int_v w_e^2(m_g)m_g^2 dv$$

if $e \to 0$.

where $(m_g,m_g)_{w_e}$ denotes the weighted square norm of $m_g$.

The corresponding parametric functional has the form:

$$P^\alpha(m)=P_g^\alpha(m_g)=(B_g m_g-d, B_g m_g-d)+\alpha(m_g,m_g)_{w_e}. \quad (28)$$

Therefore, the problem of minimization of the parametric functional introduced by equation (19) can be treated in a similar way to the minimization of the conventional Tikhonov functional with the $L_2$ norm stabilizer $s_{L_2 apr}(m)$ (equation (5)). The main difference is that now we introduce some a priori variable weighting functions $w_e(m_g)$ for model parameters.

Another important element of the present invention is that the computational procedure to minimize the parametric functional (28) is based on the re-weighted conjugate gradient method in the space of weighted image parameters.

Consider a discrete inverse problem equivalent to the linear inverse problem (1) in the case of the discrete image parameters. Suppose that original and degraded images can be represented in discrete form by the vectors $\hat{m}$ and $\hat{d}$.

In this case, the equation (1) can be rewritten in a matrix notation:

$$\hat{d}=\hat{B}\hat{m}, \quad (29)$$

where $\hat{B}$ is the matrix of the blurring operator. Introducing new parametrization of the image $m_g$ we can write the matrix equation (29) in a form $$\hat{d}=\hat{B}_g \hat{m}_g,$$

where new blurring operator matrix $\hat{B}_g$ is composed of the original blurring operator matrix $\hat{B}$ and the matrix of the inverse gradient (integral) operator $\hat{\nabla}_{-1}$:

$$\hat{B}_g = \hat{B}\hat{\nabla}^{-1}. \quad$$

The matrix $\hat{\nabla}^{-1}$ may be easily precomputed as the inverse matrix to the matrix of the finite-difference gradient operation applied to the discrete image parameters.

Parametric functional (28) can be expressed now using matrix notations:

$$P_g^\alpha(\hat{m}) = (\hat{B}_g(\hat{m}_g)-\hat{d})^*(\hat{B}_g(\hat{m}_g)-\hat{d}) + \alpha(\hat{W}_e \hat{m}_g)^* \hat{W}_e \hat{m}_g, \quad (30)$$

where asterisk "*" denotes transposed complex conjugate matrix, and $\hat{W}_e = \hat{W}_e(\hat{m}_g)$ is the matrix of the weighting function $w_e(m_g)$ introduced above in equation (27). We call matrix $\hat{W}_e$ a sharpening weighting matrix.

The problem of minimization of the parametric functional (30) can be reformulated using the space of weighted parameters:

$$\hat{m}_g^w = \hat{W}_e \hat{m}_g \quad (31)$$

We can consider the modified blurring operator $\hat{B}_g^w$ which relates the new weighted parameters $\hat{m}_g^w$ to the data $$\hat{d} = \hat{B}_g^w(\hat{m}_g^w) \quad (32)$$

In order to keep the same data we should assume $$\hat{B}_g^w = \hat{B}_g \hat{W}_e^{-1} \quad (33)$$

Using these notations we can rewrite the parametric functional as follows $$P_g^\alpha(\hat{m}_g^w) = (\hat{B}_g(\hat{W}_e^{-1}\hat{m}_g^w)-\hat{d})^*(\hat{B}_g(\hat{W}_e^{-1}\hat{m}_g^w)-\hat{d}) + \alpha(\hat{m}_g^w)^* \hat{m}_g^w \quad (34)$$

In other words, we keep the same misfit, as in equation (30) because $$\phi_w(\hat{m}_g) = (\hat{B}_g(\hat{W}_e^{-1}\hat{m}_g^w)-\hat{d})^*(\hat{B}_g(\hat{W}_e^{-1}\hat{m}_g^w)-\hat{d}) = (\hat{B}_g(\hat{m}_g)-\hat{d})^*(\hat{B}_g(\hat{m}_g)-\hat{d}) \quad (35)$$

and the same stabilizer, as in equation (30), equal to the least square norm of $\hat{m}_g$ with the weights $$s_w = (\hat{m}_g^w)^* \hat{m}_g^w = \hat{m}_g^* \hat{W}\hat{m}_e^2 \hat{m}_{1lg}. \quad (36)$$

Therefore, the minimization problem (34) is equivalent to the minimization problem (30). However, the iterations generated in the framework of gradient type methods would be different for (34) in comparison with the iterations introduced above for (30). Moreover, numerical examples show that, as a rule, iterative process converges faster for (34) than for (30).

To construct the iterative process in the space of weighted parameters we perturb now the parametric functional with respect to the weighted parameters $\hat{m}^w$:

$$\delta_{\hat{m}_g^w} P_g^\alpha(\hat{m}_g^w) = 2(\delta\hat{m}_g^w)^*[\hat{B}_g^{w^*}(\hat{B}_g(\hat{m}_g)-\hat{d}) + \alpha\hat{m}_g^w] \quad (37)$$

We can apply first the traditional gradient type method. In this case the perturbation of the model parameters should be selected to be equal to:

$$\delta\hat{m}_g^w = -k\hat{l}(\hat{m}_g^w) \quad (38)$$

where $\hat{l}(\hat{m}_g^w)$ is the direction of steepest ascent, $$\hat{l}(\hat{m}_g^w) = \hat{W}_e^{-1}\hat{B}_g^*(\hat{B}_g(\hat{W}_e^{-1}\hat{m}_g^w)-\hat{d}) + \alpha\hat{m}_g^w \quad (39)$$

and k is the length of the step.

In the method of this invention we propose to use the conjugate gradient method to find the minimum of the parametric functional. It is based on the successive line search in the conjugate gradient direction $\hat{l}(\hat{m}_n)$:

$$\hat{m}_{g,n+1} = \hat{m}_{g,n}^w + \delta\hat{m}^w = \hat{m}_{g,n}^w - k_n\tilde{l}(\hat{m}_{g,n}^w), \quad (40)$$

The idea of the line search is the following. We present $P_g^\alpha(\hat{m}_{g,n}^w - k\tilde{l}(\hat{m}_{g,n}^w))$ as a function of one variable $k_1$, and, evaluating it three times along direction $\tilde{l}(\hat{m}_{g,n}^w)$, approximately fit it by a parabola, find its minimum and the value of $k_n$, corresponding to this minimum.

The conjugate gradient directions $\tilde{l}(\hat{m}_{g,n}^w)$ are selected as follows. On the first step we use the gradient direction:

$$\tilde{l}(\hat{m}_{g,0}^w) = \hat{l}(\hat{m}_{g,0}^w) = \hat{W}_{e0}^{-1}\hat{B}_g^*(\hat{B}_g(\hat{W}_{e0}^{-1}\hat{m}_{g,0}^w)-\hat{d}) + \alpha\hat{m}_{g,0}^w \quad (41)$$

On the next step, the conjugate gradient direction is the linear combination of the gradient on this step and the direction $\hat{l}(\hat{m}_0^w)$ on the previous step:

$$\tilde{l}(\hat{m}_{g,1}^w) = \hat{l}(\hat{m}_{g,1}^w) + \beta_1 \tilde{l}(\hat{m}_{g,0w})$$

On the nth step $$\tilde{l}(\hat{m}_{g,n+1}^w) = \hat{l}(\hat{m}_{g,n+1}^w) + \beta_{n+1}\tilde{l}(\hat{m}_{g,n}^w).$$

where $$\hat{l}(\hat{m}_{g,n}^w) = \hat{W}_{en}^{-1}\hat{B}_g^*(\hat{B}_g(\hat{W}_{en}^{-1}\hat{m}_{g,n}^w)-\hat{d}) + \alpha\hat{m}_{g,n}^w,$$

and $$\hat{m}_{g,n}^w = \hat{W}_{en}\hat{m}_{g,n}.$$

The coefficients $\beta_{n+1}$ are defined from the condition that the directions $\tilde{l}(\hat{m}_{g,n+1})$ and $\tilde{l}(\hat{m}_{g,n}^w)$ are conjugate:

$$\beta_{n+1} = \frac{\|\tilde{l}(\hat{m}_{g,n+1}^\omega)\|^2}{\|\tilde{l}(\hat{m}_{g,n}^\omega)\|^2} \quad (42)$$

Note that the iterative process (40) converges to the minimum of the functional (30). This algorithm always converges because on every iteration we apply the parabolic line search. We call this algorithm conjugate gradient re-weighted optimization because the sharpening weighting matrix $\hat{W}_{en}$ is updated on every iteration. One can find the formal proof of the convergence of this type of optimization technique in (U., Eckhart, "Weber's problem and Weiszfeld's algorithm in general spaces," Math. Programming, v.18, (1980) pp. 186–196). Note that in the case of linear forward operator $B_9$ parametric functional has only one local minimum, so the minimization of $P_g^\alpha$ is unique (A. N., Tikhonov, and V. Y., Arsenin, "Solution of ill-posed problems," V. H. Winston and Sons., (1977)).

The advantage of the conjugate gradient re-weighted optimization algorithm is that we do not have to know the gradient of $f(\hat{m})$ for every iteration, but only its value for corresponding model parameters, which is easy to calculate.

The final step of the described algorithm involves recalculating the real image parameters from the weighted solution according to formula:

$$\hat{m}_{n+1} = \hat{\nabla}_{-1} \hat{W}_{e(n+1)} \hat{m}_{g,n+1}{}^w.$$

Another important new element of this invention is introducing the penalization function in the image restoration process.

Let us assume that the ideal image can be described as a combination of the background image, $M_{bg}(r)$, and the anomalous part of the image, $m_\alpha(r)$, where r is the coordinate of some point in domain V. In this situation it is required that there should be only two values of the parameter m(r) in the focused image equal to the background value or to the anomalous value. However, the geometrical distribution of these values is unknown. We can force the inversion to produce an image which not only generates the observed degraded image but which is also described by these known values, thus painting the geometry of the ideal object. We call this approach "penalization". There is a simple and straightforward way of combining penalization and the MGS method. Numerical tests show that MGS generates a stable image, but it tends to produce the smallest possible anomalous domain. It also makes the image look unrealistically sharp. At the same time, the image parameter values m(r) outside this local domain tend to be equal to the background value $m_{bg}(r)$ which nicely reproduces the background image. We can now impose the upper bound for the positive anomalous parameter values $m_a{}^{ub}(r)$, and during the sharpening process simply chop-off, or discard, all the values above this bound. This algorithm can be described by the following formula:

$$m(r) - m_{bg}(r) = m_{ub}{}^a(r), \text{ if } [m(r) - m_{bg}(r)] \geq m_{ub}{}^a(r):$$

$$m(r) - m_{bg}(r) = 0, \text{ if } [m(r) - m_{bg}(r)] \leq 0.$$

Thus, according to the last formula the image parameters values m(r) are always distributed within the interval:

$$m_{bg}(r) \leq m(r) \leq m_{bg}(r) + m_{ub}{}^a(r).$$

A similar rule is applied for the case of negative anomalous parameter values.

Hence, an important feature of the present invention is the ability to enhance and sharpen degraded images. It is realized numerically as the following seven steps.

Step 1. Constructing the initial restoration of the ideal image gradient parameters $\hat{m}_{g,1}$ according to the formula $$\hat{m}_{g,1} = -k_0 \hat{l}(\hat{m}_0{}^w) = -k_0 \hat{W}_{e0}{}^{-1} \hat{B}_g{}^* (\hat{B}_g(\hat{W}_{e0}{}^{-1}\hat{m}_{g,0}{}^w) - \hat{d}) - \alpha k_0 \hat{m}_{g,0}{}^w \quad (43)$$

Note that we assume that starting zero iteration is equal to zero $\hat{m}_{g,0}{}^w = 0$, and $\hat{W}_{e0}$ is equal to the identity matrix $\hat{W}_{e0} = \hat{I}$, so the starting approximation of the ideal image gradient parameters is generated by applying the transposed complex conjugated blurring operator and the inverse gradient operator to the blurred image. Mathematically it can be described by matrix multiplication:

$$\hat{m}_{g,1} = k_0 \hat{B}_g{}^* \hat{d} = k_0 \hat{\nabla}^{-1} \hat{B}^* \hat{d}_1 \quad (44)$$

where $k_0$ is the length of the initial step.

Step 2. Computing the inverse sharpening filter (matrix $\hat{W}_{e1}{}^{-1} = \hat{M}^{-1}{}_e(\hat{m}_{g,1})$) on the 1-st iteration as the matrix of the function $w_e(m_{g,1})$ introduced above in equation (27):

$$w_e(m_{g,1}) = (\|m_{g,1}\|^2 + e^2)^{1/2} \sim \|m_{g,1}\|. \quad (45)$$

Step 3. Constructing the partially sharpened image (second iteration to the weighted restored image) according to the formula:

$$\hat{m}_{g,2}{}^w = \hat{m}_{g,1} + \delta\hat{m}_{g,1}{}^w = \hat{m}_{g,1} - k_1 \hat{l}(\hat{m}_{g,1}{}^w),$$

Here $$\hat{l}(\hat{m}_{g,1}{}^w) = \hat{l}(m_{g,1}{}^w) + \beta_1 \hat{l}(\hat{m}_{g,0}{}^w).$$

where $$\hat{l}(\hat{m}_{g,1}{}^w) = \hat{l}(m_{g,0}{}^w) = W_{e0}{}^{-1} B_g{}^* (\hat{B}_g(\hat{W}_{e0}{}^{-1}\hat{m}_{g,0}{}^w) - d) + \alpha \hat{m}_{g,0}{}^w,$$

$$\hat{l}(m_{g,1}{}^w) = W_{e1}{}^{-1} B_g{}^* (\hat{B}_g(\hat{W}_{e1}{}^{-1}\hat{m}_{g,1}{}^w) - d) + \alpha \hat{m}_{g,1}{}^w.$$

The length of the step $k_1$ is determined by the line search to the minimum of the functional $P_g{}^0$ ($\hat{m}_{g,1}{}^w - k\hat{l}(\hat{m}_{g,1}{}^w)$) Parameter $\beta_1$ is calculated by the formula:

$$\beta_1 = \frac{\|\hat{l}(\hat{m}_{g,1}^\omega)\|^2}{\|\hat{l}(\hat{m}_{g,0}^\omega)\|^2}.$$

Step 4. Computing the inverse sharpening filter (matrix $\hat{W}_{en}$) on the n-th iteration (n=2,3, ... ) as the matrix of the weighting function $w_e(m_{g,n-1})$ introduced above in equation (27):

$$w_e^{-1}(m_{g,n-1}) = (\|m_{g,n-1}\|^2 + e^2)^{1/2} \sim \|m_{g,n-1}\|. \quad (46)$$

Step 5. Constructing the partially sharpened weighted image ((n+1)-th iteration to the restored image) according to the formula $$\hat{m}_{g,n+1} \sim \hat{m}_{g,n}{}^w + \delta\hat{m}_{g,n}{}^w = \hat{m}_{g,n}{}^w - k_n \hat{l}(\hat{m}_{g,n}{}^w), \quad (47)$$

where weighted conjugate gradient directions are determined by the expressions:

$$\hat{l}(\hat{m}_{g,n}{}^w) = \hat{l}(\hat{m}_{g,n}{}^w) + \beta_n \hat{l}(\hat{m}_{g,n-1}{}^w), \quad (48)$$

$$\hat{l}(\hat{m}^w{}_{g,n}) = \hat{W}_{en}{}^{-1} \hat{B}_g{}^* (\hat{B}_g(\hat{W}_{en}{}^{-1}\hat{m}^w{}_{g,n}) - \hat{d}) + \alpha \hat{m}^w{}_{g,n}. \quad (49)$$

The length of the step $k_n$ is determined by the line search to the minimum of the functional $P^\alpha$ ($\hat{m}_{g,n}{}^w - k_n \hat{l}(\hat{m}_{g,n}{}^w)$). Parameter $\beta_n$ is calculated by the formula:

$$\beta_n = \frac{\|\hat{l}(\hat{m}_{g,n}^\omega)\|^2}{\|\hat{l}(\hat{m}_{g,n-1}^\omega)\|^2}.$$

Step 6. Recomputing the real parameters of the ideal image from the weighted parameters at the (n+1)-th iteration by inverse filtering the weighted image:

$$\hat{m}_{n+1} = \hat{\nabla}^{-1} \hat{W}_{e(n+1)}{}^{-1} \hat{m}_{g,n+}{}^w \quad (50)$$

Step 7. Imposing the upper bound $m_a{}^{ub}(r)$ for the positive anomalous parameter values, and the lower bound $-m_a{}^{1b}(r)$ for the negative anomalous parameter values and chopping-off, or discarding, all the values outside these bounds during entire image restoration process to keep the image parameters values $m_n(r)$ always distributed within the interval:

$$m_{bg}(r) - m_a{}^{1b}(r) \leq m_n(r) \leq m_{bg}(r) + m_a{}^{ub}(r). \quad (51)$$

Figure 1:
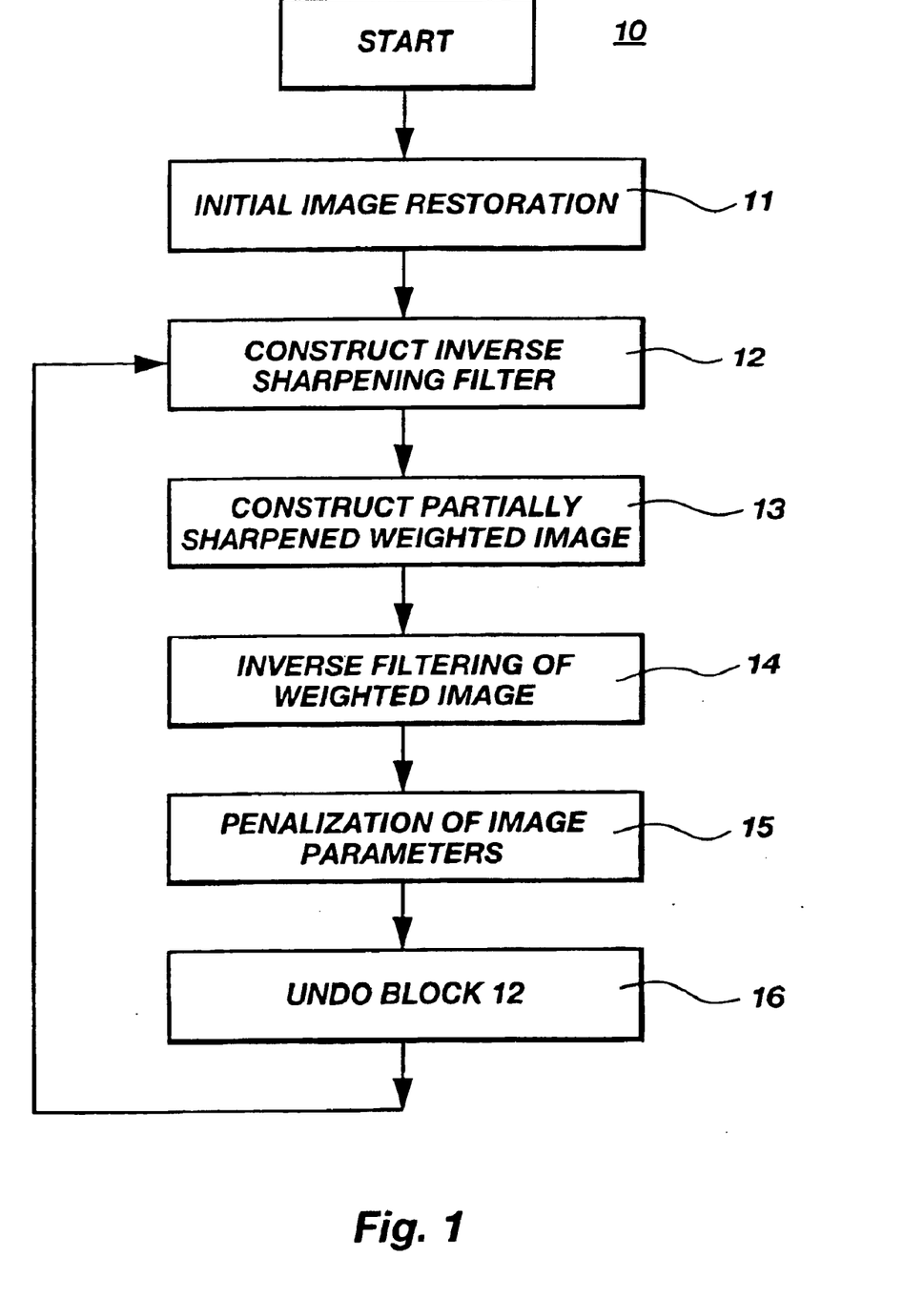
FIG. 1 is a flow chart illustrating the image enhancement and sharpening method of this invention.

In the drawing, FIG. 1 presents the flow chart illustrating the image enhancement and sharpening method 10 of the present invention. The method can be performed upon the degraded image expressed as a digitized M×M array d=d $(x_i, y_j)$ (for a 2-D image) or a digitized M×M×M array d=d $(x_i, y_j, z_k)$ (for a 3-D image). The linear blurring operator $\hat{B}$ is assumed to be given as a square matrix of the size $M^2 \times M^2$ (for a 2-D image) or $M^3 \times M^3$ (for a 3-D image).

Referring again to FIG. 1 the first step is the initial restoration of the image (block 11) by applying a transposed matrix of blurring operator and a inverse matrix of gradient operator (integration) to the digital blurred (degraded) image according to formula (43).

An inverse sharpening filter, according to the present invention, is then numerically constructed, as represented in block 12 (FIG. 1), by use of a function $w_e$ $(m_{g,1})$ accomplishing a minimum gradient support constraint according to formula (45).

In partially sharpened image block 13 of image enhancement and sharpening method 10, the subsequent iteration of the weighted restored image is constructed according to formulae (47), (48), and (49).

In inverse filtering block 14, the real parameters of the ideal image are recalculated from the weighted parameters by inverse filtering the weighted restored image.

In penalization block 15, the image parameters values are forced to be distributed within the given interval to produce a sharp, enhanced original image.

The construction of the sharpening filter is then undone in block 16. This is the same procedure as used in block 12 of image enhancement and sharpening method 10, but applied now to the image constructed in the previous block 15 acording to formula (46).

Execution of the image enhancement and sharpening method 10 may then return in a recursive loop through constructing sharpening filter block 12, to partially sharpened image block 13, to inverse filtering block 14, and finally to penalization block 15, until the norm of a difference between the observed degraded image d and numerically predicted degraded image $d_{pr}$ corresponding to the sharp ideal image $m_{n+1}$ generated in block 15 reaches a given tolerance value $$\varepsilon : \|\hat{d} - \hat{d}_{pr}\| = \|\hat{d} - \hat{B}\hat{m}_{n+1}\| = \varepsilon.$$

An important feature of the present invention is that the image deblurring method 10 can be applied to restoration of blurred images of arbitrary origin.

Figure 2:
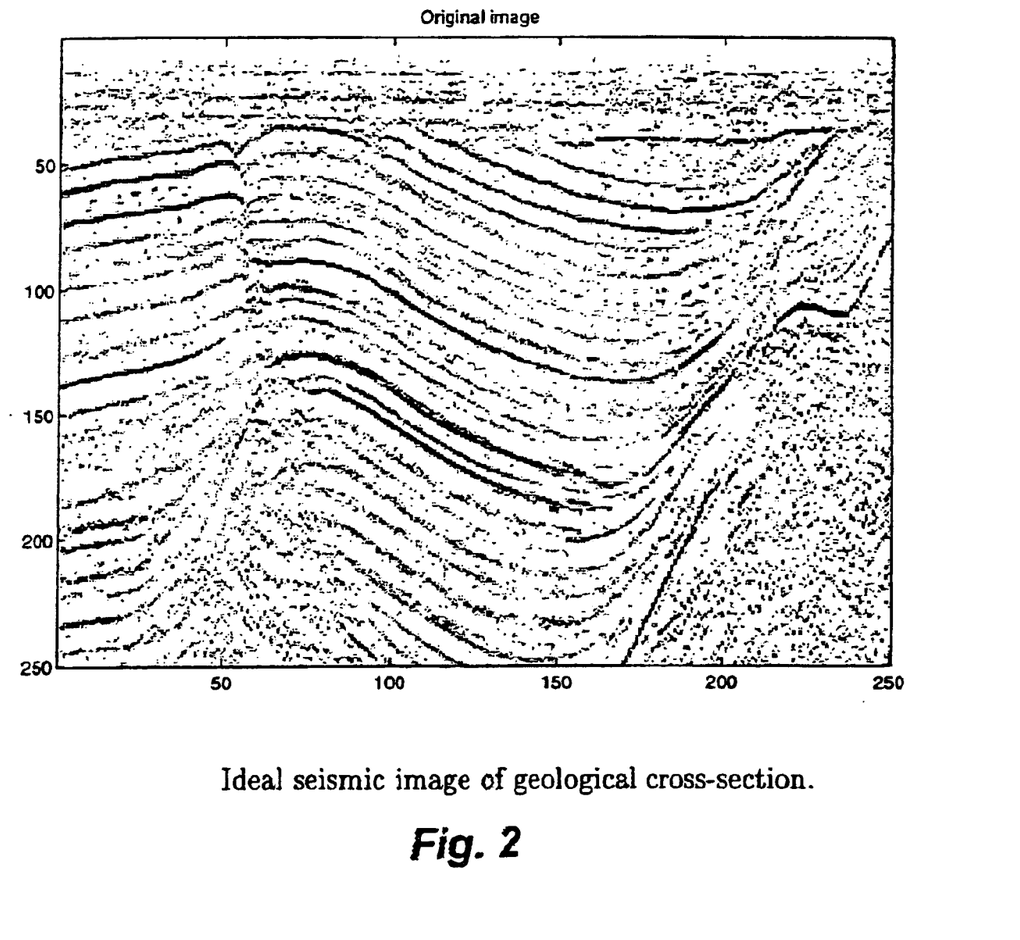
FIG. 2 is an ideal seismic image of a geological cross-section.
Figure 3:
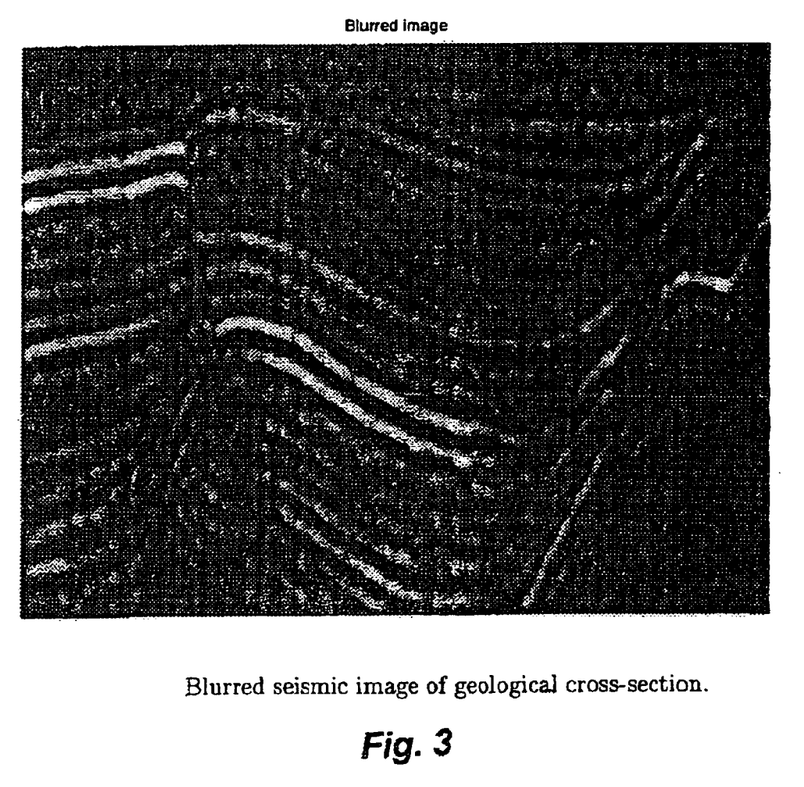
FIG. 3 is a typical blurred seismic image of the same cross-section shown in FIG. 2 which is generated as the result of conventional seismic exploration technique.
Figure 4:
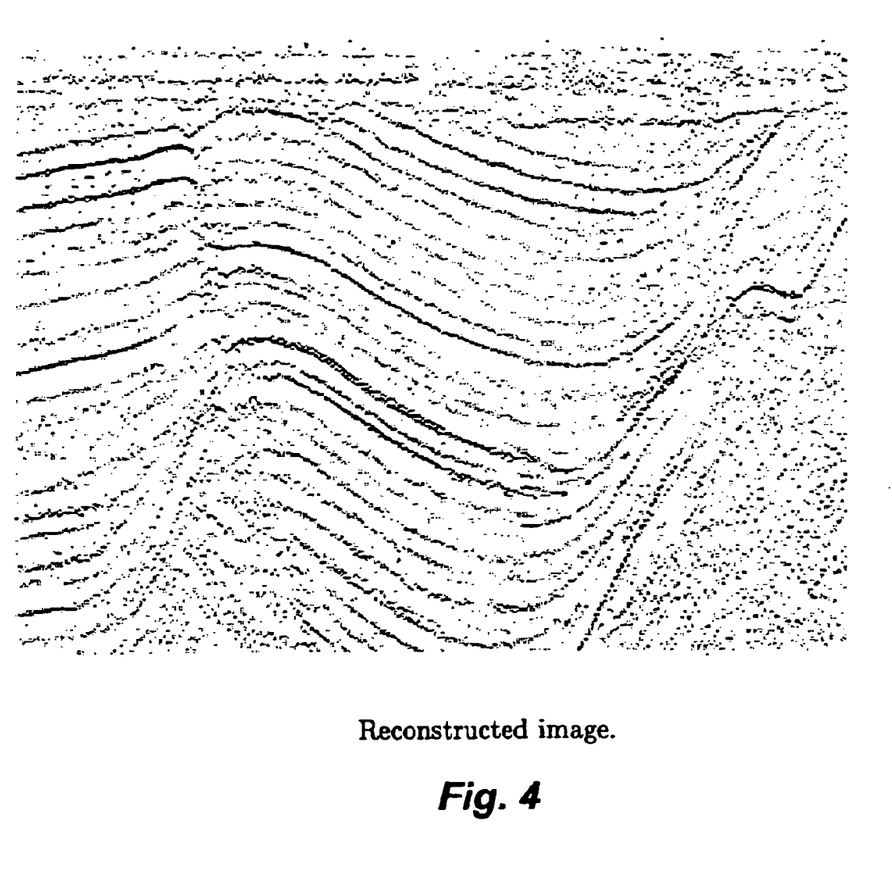
FIG. 4 is a reconstructed image generated by the method of digital image enhancement and sharpening of the present invention.

As an example of an application of this method, we present here a result of an image enhancement and sharpening experiment conducted for a seismic image. FIG. 2 shows the ideal seismic image of a geological cross-section. FIG. 3 presents the typical blurred seismic image of the same cross-section which is generated as the result of conventional seismic exploration technique. This image has been processed by the digital image enhancement and sharpening method 10 of the present invention. The reconstructed image is shown in FIG. 4. One can see that this image is practically identical to the original ideal image presented in FIG. 2.

Hence, an important feature of the present invention is the ability to produce a realistic original image from a degraded one. It is believed that the image enhancement and sharpening method 10 of the present invention can be used in optical image processing, for image restoration and sharpening in biomedical, geophysical, astronomical, high definition television, remote sensing, and other industrial applications.

The method of the present invention is based on three new ideas that make it useful in image restoration technique. The first idea is to use a new physical constraint in image restoration procedure based on minimization of the area where strong image parameter variations and discontinuities occur. This constraint provides substantial qualitative improvement in image reconstruction procedures. The second idea is to implement this constraint in a form of weights imposed on image parameters, which makes it practical to realize this constraint in a numerical algorithm. The third idea is penalization of the image parameters to keep them within given reasonable limits of variations. Together these three new ideas result in a new method 10 of digital image enhancement and sharpening.

The method 10 of the present invention can be implemented numerically using a general purpose computer programmed to perform the procedures of the blocks 11–16. It can a be understood that the method 10 of the present invention may also be performed using dedicated hardware specially designed to solve the constraint minimization problem of the instant method 10.

What is claimed is:

1. In a method of digital image enhancement of a multi-dimensional digital image, said image being represented by a matrix [d] comprising image parameters, wherein said matrix [d] is mathematically manipulated to produce a solution to a linear ill-posed inverse problem to reduce blurring, the improvement comprising: imposing a constraint on the solution to the linear ill-posed inverse problem so as to produce an image matrix, said constraint being based upon minimization of the area where strong variations and discontinuities between said image parameters occur.

2. In the method of claim 1, the improvement further comprising: implementing said constraint in the form of weights imposed upon said image parameters.

3. In the method of claim 2, the improvement further comprising: imposing penalization upon said image parameters, thereby to keep said parameters within reasonable limits of variation.

4. In the method of claim 3, the improvement further comprising: solving said ill-posed problem by means of an iterative loop using a programmed computer.

5. In the method of claim 4, stopping said iterative loop when the norm of a difference between the observed degraded image and a numerically predicted degraded image corresponding to an iteratively sharpened image reaches a tolerance value.

6. A method of digital image enhancement of a multidimensional digital image, said image being represented by a matrix [d] comprising image parameters, comprising the steps of:

a) initially restoring a digital image [m] by applying a transposed complex conjugated blurring operator, and an inverse gradient operator to the initial degraded digital image [d];

b) computing an inverse sharpening filter, thereby to minimize the area where strong image parameter variations and discontinuities occur;

c) constructing a partially sharpened weighted image by applying said inverse sharpening filter;

d) constructing an inverse filtered image by inverse filtering said partially sharpened weighted image using said inverse sharpening filter and said inverse gradient operator;

e) checking the norm of a difference between the observed degraded image and a numerically predicted degraded image corresponding to said sharpened image; if said norm is equal to or less than a user defined tolerance value, then calculating the nonblurred image; otherwise, continuing to step f);

f) undoing the results of loop steps comprising steps b), c), d), and e); and returning to step b).

7. The method of claim 6 further including, subsequent to step d, and prior to step e), the additional step of imposing penalization to said inverse filtered image, thereby forcing the image parameters to be distributed within an interval bounded by a first upper value and a first lower value.

8. The method of claim 6 wherein said digital image is represented by a 2-dimensional matrix [d].

9. The method of claim 6 wherein said digital image is represented by a 3-dimensional matrix [d].

10. The method of claim 6 wherein one or more calculations comprised by steps of said method are performed using a programmed computer.

11. The method of claim 6 wherein said inverse sharpening filter of step b is constructed using constraints comprising weights imposed upon image parameters.

12. The method of claim 11 wherein said inverse sharpening filter comprises a minimum gradient support constraint.

13. The method of claim 6 wherein step c further includes using conjugate gradient re-weighted optimization.

14. The method according to claim 6, wherein: said step b) further comprises the steps of determining the spatial gradient of the partially sharpened image parameters and subsequently deriving a variable weighting function accomplishing a minimum gradient support constraint based upon minimizing the area of a nonzero spatial gradient of the image parameters.

15. The method according to claim 14, wherein: said minimum gradient support constraint is of the form $$\frac{\|\nabla m\|^2}{\|\nabla m\|^2 + e^2} = \text{minimum}$$

16. The method according to claim 6, wherein: said step c) further includes the step of solving the following numerical formula for (n+1)-th iterations:

$$\hat{m}_{g,n+1}{}^w = \hat{m}_{g,n}{}^w + \delta \hat{m}g, n^w = \hat{m}g, n - k_n \hat{l}(\hat{m}_{g,n}{}^w),$$

wherein weighted conjugate gradient directions $\hat{l}(\hat{m}_{g,n}{}^w)$ are determined by the expressions:

$$\hat{l}(\hat{m}_{g,n}{}^w) = \hat{l}(\hat{m}_{g,n}{}^w) + \beta_n \hat{l}(\hat{m}_{g,n}{}^w)$$

$$\hat{l}(\hat{m}_{g,n}{}^w) = \hat{W}_{en}^{-1} \hat{B}_g{}^* (\hat{B}_g(\hat{W}_{en}^{-1} \hat{m}_{g,n}{}^w) - \hat{d}) + \alpha \hat{m}_{g,n}{}^w,$$

and $\hat{W}_{en}$ is the matrix of said sharpening filter, wherein the length of the step $k_n$ is determined by the line search to the minimum of the functional of the weighted image parameters $P_g^a (\hat{m}_{g,n} - k_n \hat{l}(\hat{m}_{g,n}{}^w))$., and parameters $\beta_n$ is calculated by the formula:

$$\beta_n = \frac{\|\hat{l}(\hat{m}_{g,n}^w)\|^2}{\|\hat{l}(\hat{m}_{g,n-1}^w)\|^2}.$$

17. The method according to claim 6, wherein: said step d) further comprises recomputing the real parameters of the ideal image from the weighted parameters $\hat{m}_{g,n+1}$ at the (n+1)-th iteration by solving the following numerical formula:

$$\hat{m}_{n+1} = \hat{\nabla}^{-1} \hat{W}_{e(n+1)} \hat{m}_{g,n+1}.$$

18. The method according to claim 7, wherein: said step imposing penalization comprises imposing the upper bound $m_a{}^{ub}(r)$ for the positive anomalous image parameter values, and the lower bound $-m_a{}^{lb}(r)$ for the negative anomalous image parameter values, and discarding all the values outside these bounds during the entire image restoration process, thereby to keep the image parameters values $m_n(r)$ always distributed within the interval:

$$m_{bg}(r) - m_a{}^{lb}(b\ r) \leq m_n(r) \leq m_{bg}$$

$$(r) + m_a{}^{ub}(r).$$

\* \* \* \* \*

UNITED STATES PATENT AND TRADEMARK OFFICE
CERTIFICATE OF CORRECTION

PATENT NO. : 6,879,735 B1
DATED : April 12, 2005
INVENTOR(S) : Oleg N. Portniaguine et al.

It is certified that error appears in the above-identified patent and that said Letters Patent is hereby corrected as shown below:

Title page,
Item [56], References Cited, OTHER PUBLICATIONS,
"Inversion of Large-Supoort III..." reference, delete "Supoort" and insert -- Support --, therefore; and "R. Acar and C.R. Vogel" reference, delete "Proglems" and insert -- Problems --, therefore.

Column 14,
Line 66, delete "d" and insert -- d) --, therefore.

Column 15,
Line 15, delete "c" and insert -- c) --, therefore.
Line 27, after "minimum" insert -- . --, therefore.
Line 34, after "+" delete " $\delta \hat{m}g, n^w = \hat{m}g, n$ " and insert -- $\delta \hat{m}_{g,a}^w = \hat{m}_{g,n}^w$ --.

Line 38, delete " $\hat{l}(\hat{m}_{g,n}^w) = \hat{l}(\hat{m}_{g,n}^w) + \beta_n \hat{l}(\hat{m}_{g,n}^w)$ " and insert
-- $\hat{l}(\hat{m}_{g,n}^w) = \hat{l}(\hat{m}_{g,n}^w) + \beta_n \hat{l}(\hat{m}_{g,n-1}^w)$ --.

Column 16,
Line 4, after "said" insert -- inverse --.
Line 7, after "parameters" delete " $P_g^a(\hat{m}_{g,n})$ " and insert -- $P_g^a(\hat{m}_{g,n}^w)$ --.

Line 18, delete " $\hat{m}_{g,n+1}$ " and insert -- $\hat{m}_{g,n+1}^w$ --.

Line 23, delete " $\hat{m}_{n+1} = \hat{\nabla}^{-1}\hat{W}_{e(n+1)}\hat{m}_{g,n+1}$ " and insert -- $\hat{m}_{n+1} = \hat{\nabla}^{-1}\hat{W}_{e(n+1)}^{-1}\hat{m}_{g,n+1}^w$ --.

Line 35, delete "(b r)" and insert -- (r) --, therefore.

Signed and Sealed this

Thirteenth Day of December, 2005

JON W. DUDAS
*Director of the United States Patent and Trademark Office*